United States Patent [19]
Denham

[11] Patent Number: 5,346,348
[45] Date of Patent: Sep. 13, 1994

[54] SELF-PLUGGING BLIND FASTENER

[75] Inventor: Keith Denham, Welwyn Garden, England

[73] Assignee: Avdel Systems Limited, Welwyn Garden, England

[21] Appl. No.: 97,025

[22] Filed: Jul. 27, 1993

[30] Foreign Application Priority Data

Aug. 21, 1992 [GB] United Kingdom ............. 9217806.0

[51] Int. Cl.$^5$ ...................... F16B 13/04; F16B 13/06
[52] U.S. Cl. ......................................... 411/43; 411/70
[58] Field of Search ..................... 411/34, 37, 38, 43, 411/45, 48, 69, 70

[56] References Cited

U.S. PATENT DOCUMENTS

| | | | |
|---|---|---|---|
| 4,863,325 | 9/1989 | Smith | 411/43 |
| 4,919,576 | 4/1990 | Louw et al. | 411/43 X |
| 5,006,024 | 4/1991 | Siebol | 411/43 |
| 5,131,107 | 7/1992 | Pratt et al. | 411/43 X |

Primary Examiner—Neill R. Wilson
Attorney, Agent, or Firm—Oblon, Spivak, McClelland, Maier & Neustadt

[57] ABSTRACT

A self-plugging blind fastener suitable for fastening apertured sheets together, and of the type comprising a body having a shank, headed at one end, and an axial bore in which is disposed an elongate stem which, in use, is pulled to expand the shank and lock part of the stem in the body, has an improvement for locking the stem in the body. The head end of the bore is of reduced diameter and presents a stop-shoulder. The stop-shoulder is an annular skirt partly separated from surrounding material by an annular cleavage, and presents a planar stop-face facing away from the head-end. The stem comprises a plug which is connected by a breakneck to a stem-tail for pulling the plug into the bore of the body. The plug has an annular locking recess spaced from the breakneck, and is radially enlarged on the side of the locking recess remote from the breakneck to provide a plug-shoulder and shank-enlarging means. The plug-shoulder presents a planar face for engaging the stop face of the body and deforming the annular skirt into the locking recess during setting of the fastener.

12 Claims, 7 Drawing Sheets

SELF-PLUGGING BLIND FASTENER

BACKGROUND OF THE INVENTION

1. Field of the Invention

This invention relates to a self-plugging blind fastener, such as a blind rivet or blind bolt, of the kind comprising a headed tubular body and an elongate stem which, in order to set the fastener, is pulled along the bore of the body so as to deform the body to form a blind head and wherein at least part of the stem is positively locked in the bore of the body of the set fastener so that the part is retained as a plug, closing the bore and contributing strength to the fastener, without risk of the plug becoming separated from the body.

2. Discussion of the Background

Examples of such fasteners are described in British Patents Nos. 1 538 872 and 2 127 514.

In GB 1 538 872, the stem has a plug part provided with an annular skirt surrounding an inner core of the plug part, and, during setting of the fastener, the free end of the skirt is deformed so as to flare radially outwardly and to engage an abutment surface of the body which faces axially towards the head end of the body. Thus the plug part is locked in the bore of the body by abutment of the flared end of the skirt and the abutment surface of the body.

In GB 2 127 514, the fastener includes a stem, or "pin", having an annular lock pocket and an annular stop shoulder adjacent to the lock pocket, and a headed tubular body or "sleeve" having a bore which is reduced in diameter near the head of the sleeve to provide an annular stop shoulder, the stop shoulder being separated from the surrounding or "radially confronting" portion of the sleeve by an annular slit which extends axially towards the head of the sleeve, and terminating at a radially inwardly, rearwardly inclined, generally frusto-conical surface. During setting of the fastener, the annular stop shoulder of the pin engages the frusto-conical surface of the stop shoulder of the sleeve, and causes the sleeve stop shoulder to be folded or moved so that its free end moves radially inwardly into the lock pocket of the pin, and thus serves to lock the plug part of the pin in the sleeve.

In both the exemplary fasteners of the prior art referred to above, the locking of the plug part in the body of the fastener is fairly satisfactory, but can be overcome simply by reversing the movement of the material which was initially deformed to provide the locking engagement.

Thus, a moderate force tending to push the plug out of the body, such as might be encountered in rigorous conditions of use, can be sufficient to produce such a reverse movement of the locking material so that it is swept out of locking engagement with the surface it is meant to engage.

This is probably due to the fact that the locking material is provided by a free end portion of a hollow cylinder, such as the annular skirt or sleeve stop shoulder, which, to form the lock, is flared radially either outwardly or inwardly, and it is a relatively easy matter then to deform it back to its original shape.

It is desirable that the locking together of the plug and body be so strong that these parts can only be separated by shearing, rather than bending, material forming the lock. It is also desirable that the force required to form such a lock should not be very great, since it is necessary for all of the setting force to be generated by the tool used for setting the fastener, and it may also be necessary for it to be transmitted by a breakneck of limited strength which is required to break when the setting of the fastener is complete.

SUMMARY OF THE INVENTION

We have now devised a fastener having novel means for locking the plug part of the set fastener in the body and which is strongly resistant to such reverse deformation as might allow the plug to be separated from the body. As the maximum force required to form the novel lock may be greater than that required to flare a comparable volume of material at the free end of a cylinder as in the exemplary prior fasteners, we have also devised means whereby the lock can be formed progressively at loads which are low initially, and increase progressively to the maximum required to form the lock.

According to the present invention there is provided a self-plugging blind fastener comprising a tubular body and a stem, the body having an elongate shank, a radially enlarged preformed head at one end of the shank, a tail end at the other end of the shank and a bore extending axially throughout the body from the tail end to the head end, the bore having a main region extending from the tail end of the shank to an annular stop-shoulder adjacent to the preformed head, and a region of reduced diameter, as compared with the main region, extending from the stop-shoulder towards the head end, the stop-shoulder presenting a stop-face which faces towards the tail end, and having an annular cleavage coaxial with the reduced region of the bore and extending axially from the stop-face towards the head end of the body, whereby the stop shoulder is radially separated from surrounding material of the body, and thus forms an integral annular skirt on the radially inward side of the cleavage, said stem being disposed in the bore of the body, and comprising an elongate stem-tail which extends through the reduced diameter region and projects from the head end of the body, and a ping disposed adjacent to the tail end of the body and joined to the stem-tail by a frangible breakneck, the plug having a first part adjacent to the breakneck, a locking recess spaced from the breakneck by the first part, a radially enlarged plug shoulder adjacent to the locking recess, and shank-enlarging means whereby, on pulling the plug along the bore towards the preformed head, the shank may be radially enlarged to form a blind head, said radially enlarged plug shoulder presenting a planar face directed towards the stem-tail for engaging the stop face of the body, whereby, on pulling the plug along the bore, the annular skirt may be deformed by the planar face of the plug so as to enter the locking recess of the plug, characterised in that the stop-face of the annular skirt is planar, whereby, on pulling the plug so as to move the planar face of the plug shoulder axially into engagement with the planar stop-face of the skirt, so as to apply an axially compressive load to the skirt, the skirt is deformed at a position intermediate between its ends, so as to enter the locking recess, and the stop-face at the free end of the skirt remains in static engagement with the planar face of the plug shoulder.

The planar stop-face of the body and the planar face of the plug shoulder may be at right angles to the axis of the body and stem.

Either the planar stop face of the body or the planar face of the plug shoulder may be inclined at an angle to a plane at right angles to the axis of the body.

The plug may have a land between the locking recess and the plug shoulder, the land having a diameter intermediate between those of the locking recess and the plug shoulder. The locking recess may be an annular groove.

BRIEF DESCRIPTION OF THE DRAWINGS

Preferred forms of the invention will now be described, by way of example, with reference to the accompanying drawings, in which.

DESCRIPTION OF THE PREFERRED EMBODIMENTS

Figure 1:
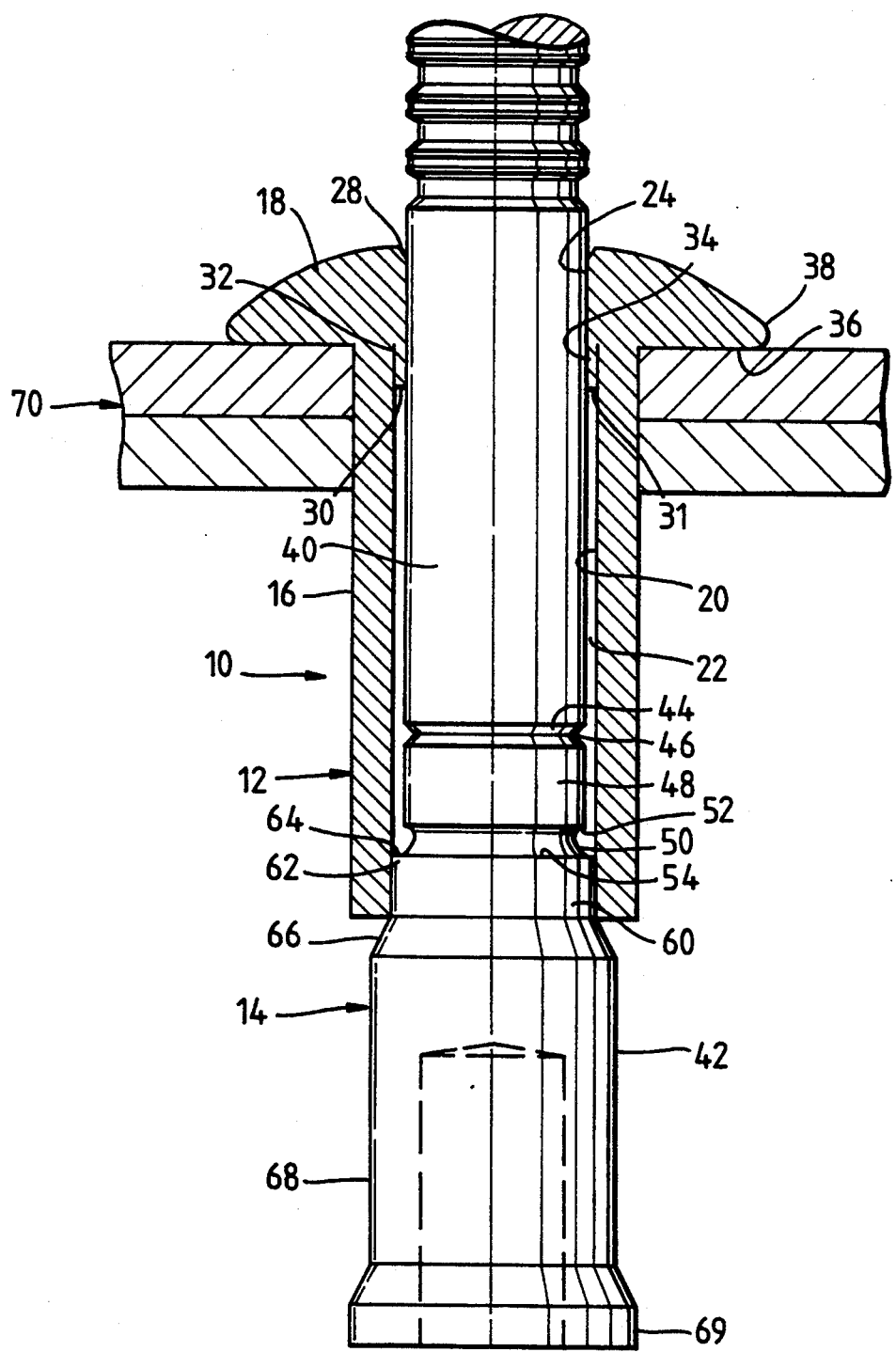
FIG. 1 is an elevation, partly in section, of one form of self-plugging blind fastener according to the invention.

Referring to FIG. 1, a blind fastener 10 comprises two parts, namely, a tubular fastener body 12 and a stem 14, which, prior to use, are assembled together to form the unitary blind fastener as shown.

The fastener body 12 comprises a cylindrical shank 16 and has a radially enlarged preformed head 18 at one end (the "head end") of the shank. The end of the shank remote from the head 18 is hereinafter referred to as "the tail end".

A bore 20 extends axially throughout the body. The bore 20 has a main region 22 which extends through the shank from the tail end to a position which corresponds generally to that at which the shank joins the head, and a region 24 of reduced diameter, as compared with the main region 22, and which extends from the main region 22 towards the head end of the body. The main region 22 of the bore is of substantially constant diameter throughout its length but may have a short, slightly flared lead-in (not shown) at the tail end if desired. The region 24 of the bore 20 is also of substantially constant diameter but has a short head flare 28 at the head end. The diameter of the bore is reduced abruptly from the main region 22 to the region 24 at a position within the shank and adjacent to the head 18 so as to form an annular stop shoulder 30. The shoulder 30 presents a stop-face 31 which faces towards the tail end of the bore and lies in a flat plane at right angles to the axis of the bore.

An annular cleavage 32, coaxial with, and having substantially the same diameter as, the main region 22 of the bore, extends from the main region into the material of the body which forms the stop shoulder around the reduced region 24. The cleavage partly separates the stop shoulder from the surrounding body material to form a cylindrical annular skirt 34 on the radially inward side of the cleavage. The skirt is attached integrally to the body at the end of the skirt nearest the head end of the body, and the free end of the skirt provides the stop face 31 of the shoulder 30. In this embodiment, the length of the cleavage 32, and hence the length of the skirt in the axial direction, is roughly twice the difference in diameter between the main region and the head region of the bore, so that the length of the skirt is roughly twice its radial thickness.

The head 18 of the body has a slightly concavely dished underhead surface 36 which faces towards the tail end of the body, and a convexly domed upper surface 38 at the head end of the body.

The stem 14 is of circular cross-section, and comprises an elongate stem-tail 40, a plug 42, and is formed with a circumferential breaker-groove 44 which demarcates the plug from the stem-tail, leaving a narrow breakneck 46 connecting the plug to the stem-tail. The breakneck is made the weakest part of the stem so that, when the stem is subjected to a predetermined tension, it will break at the breakneck rather than elsewhere.

The diameter of the stem-tail 40 is such as to be substantially the same as or slightly smaller than that of the reduced region 24 of the bore 20 of the body so that it can extend through the bore as a push-fit or with slight clearance.

The plug 42 has a cylindrical first part 48 adjoining the breakneck 46 and having a diameter substantially the same as that of the reduced region 24 of the bore of the body, so as to be able to enter the reduced region 24 either as a push-fit, or with slight clearance.

The end of the first part 48 of the plug which is remote from the breakneck 46 terminates at a circumferential locking recess 50 which, of course, has a minor diameter smaller than that of the first part 48, but not as small as that of the breaker groove.

The locking recess 50 is in the form of an annular groove of asymmetrical shape in cross-section, having a steep locking flank 52 on the side of the groove nearest the first part 48, and a long, less steep, blending flank 54 on the side remote from the first part, and a radiused root between the flanks.

Adjacent to the locking recess, on the side thereof remote from the breakneck, the diameter of the plug is increased to provide a cylindrical intermediate part 60 the diameter of which is such as to be a push-fit or sliding-fit in the main region 22 of the bore of the body. Thus, the intermediate part 60 provides a plug-shoulder 62 which is radially enlarged as compared with the first part 48, and presents a planar face 64 directed towards the stem-tail. In this embodiment the planar face 64 is at right angles to the axis of the stem, and, as the stem is disposed in, and axially aligned with, the bore of the body, the planar face 64 of the plug is able, in use of the fastener, to engage the planar stop-face 31 of the body in face to face contact.

The distance between the planar face 64 and the breakneck 46 is slightly less than the distance between the planar stop-face 31 and the head end of the body.

Beyond the intermediate part 60, the plug has a conical tapered part 66 in which the diameter of the plug increases away from the stem-tail towards a terminal part 68. The terminal part 68 is hollow, and externally cylindrical throughout its length except that its free end is radially enlarged to form a sealing flange 69. The diameter of the terminal part is substantially greater than the diameter of the main region of the bore 20, and is generally nearly as great as the external diameter of the shank 16 of the body.

Figure 2:
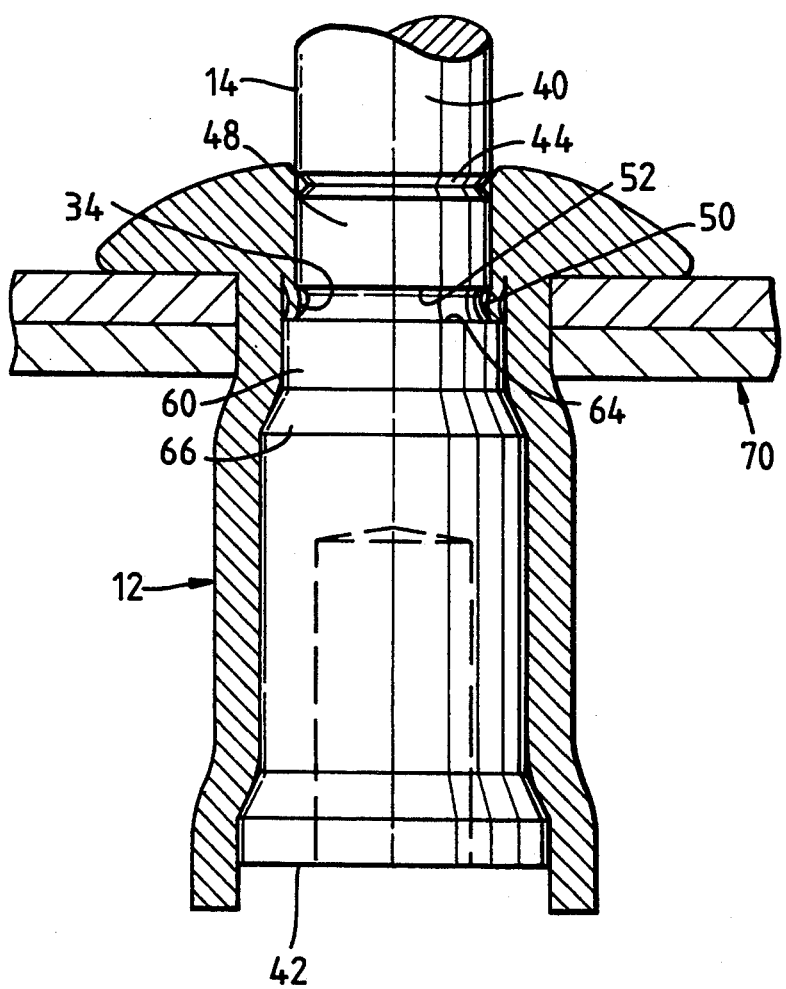
FIG. 2 is a partly sectional elevation showing an intermediate stage in the installation of the fastener of FIG. 1 in an apertured workpiece.
Figure 3:
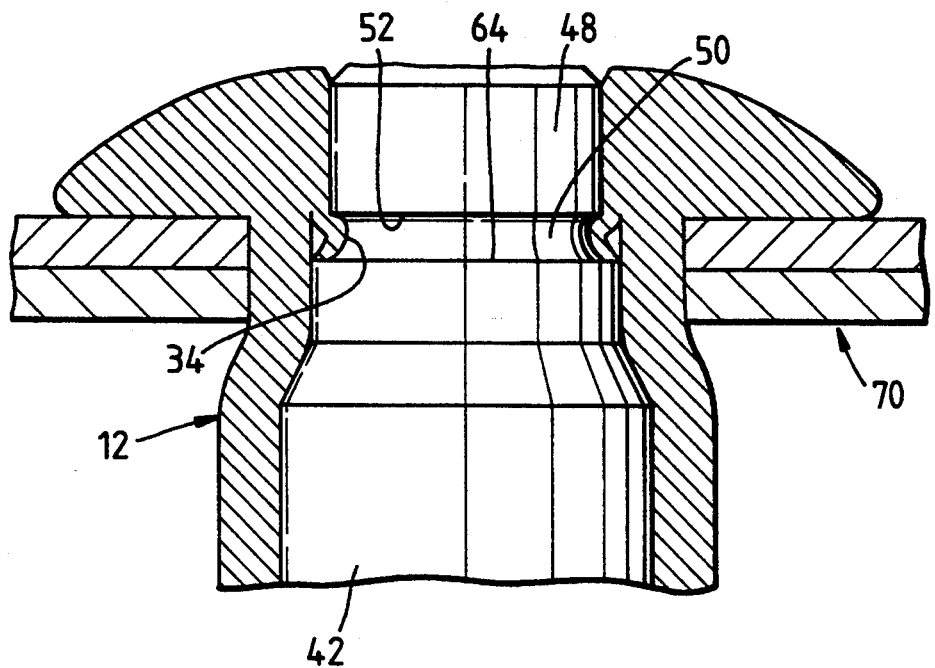
FIG. 3 is a fragmentary view, similar to FIG. 2, showing the fastener of FIG. 1 on completion of all stages of installation.

The conical tapered part 66 and the terminal part 68 together constitute shank-enlarging means which, on being pulled into the bore of the body, radially expand the shank, progressively from the tail-end, as shown in FIGS. 2 and 3, to form a blind head as is well understood in the art.

Thus, referring to FIG. 2, there is shown an intermediate stage in the installation of the fastener 10 in a workpiece 70. The workpiece comprises two apertured sheets which are assembled in face to face relationship with their apertures in register, and the fastener is inserted into the registering apertures so that the preformed head abuts one side of the workpiece, and the shank extends through, and projects beyond the opposite side of the workpiece. A suitable tool of well known type is then used to grip and pull the stem-tail while abutting the preformed head and thus supporting the body of the fastener.

Thus, the plug is pulled progressively along the bore towards the preformed head, and the shank-enlarging means enters and expands the shank progressively from the tail end. Depending upon the thickness of the workpiece, the plug may become elongated, this being facilitated by the fact that parts of the plug are hollow.

Eventually, the planar face 64 of the plug shoulder comes into face to face abutment with the planar stop-face at the free end of the skirt 34.

It will be appreciated that the cleavage between the skirt and the material surrounding the skirt renders the skirt relatively weak and easily deformable. With continued pulling of the stem, therefore, axial loading is applied by the plug shoulder to the skirt.

As the faces 31 and 64 are both planar and at right angles to the axis of the fastener, and in frictional engagement, there is no tendency for the free end of the skirt to slide across the face 64 of the plug. Thus, the face 31 of the skirt remains in static engagement with the planar face 64 of the plug, and the skirt reacts by collapsing under the applied load. However, material of the body surrounding the skirt prevents material of the skirt moving radially outwardly. Consequently, the skirt collapses as a result of material of the skirt at a position intermediate between the ends of the skirt buckling, or bulging, and moving radially inwardly into the locking recess 50 which has come to lie radially within the skirt. Thus, as shown in FIG. 2, the skirt is shown to have become buckled, with an intermediate portion of the skirt bending, and moving radially inwardly away from the surrounding material of the body, to leave an annular gap peripherally of the deformed skirt. The inwardly moved material has entered the locking recess.

With continued pulling of the stem, the locking recess becomes at least partly or even substantially filled with material of the skirt which is spaced axially through a short distance from the free end of the skirt.

As the locking recess proceeds to fill, the resistance to further deformation of the skirt increases, and with the application of increasing pulling force to the stem-tail by the tool, the stem eventually breaks at the breakneck, allowing the stem-tail to be discarded and leaving the plug locked in the body of the set fastener, as shown in FIG. 3.

Figure 4:
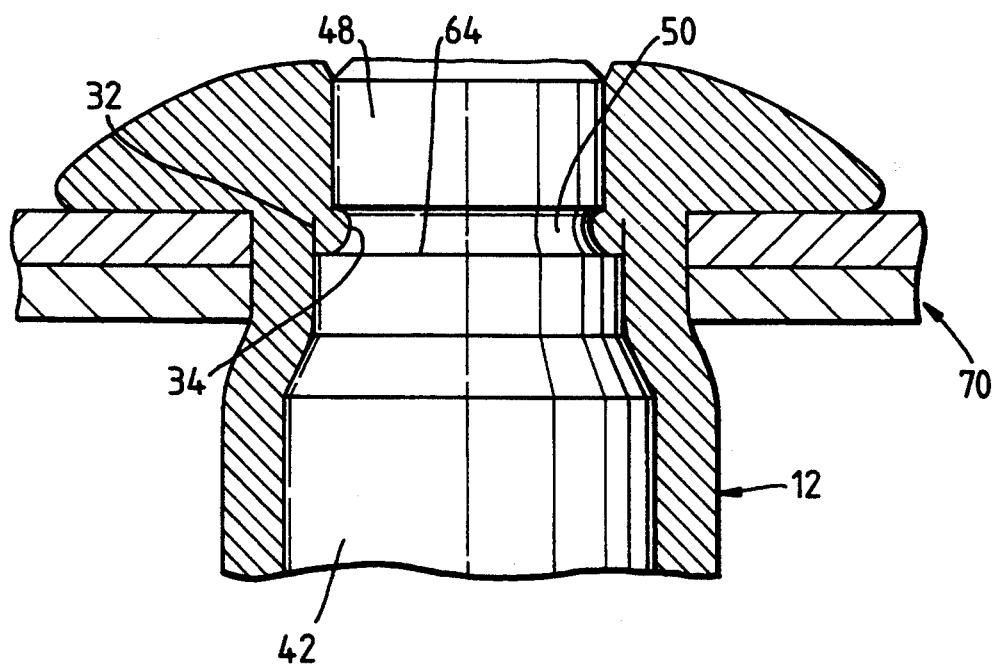
FIG. 4 is a view similar to FIG. 3, but shows an installed fastener in which the shape, on completion of installation, is slightly different from that of FIG. 3.

Depending upon the particular circumstances, such as the hardness of the material of the body, and the rate at which the skirt is deformed on pulling the stem, it may be that the material of the skirt will undergo plastic flow, so that, as shown in FIG. 4 instead of merely buckling or bending to enter the locking recess, the material of the skirt will actually flow so as to fill the recess and not leave any void peripherally of the skirt as was shown in FIG. 3.

It is found that, if an attempt is made to push the plug out of the body of the set fastener in reverse direction to that in which the plug was pulled to set the fastener, this can be achieved only by shearing off the bulging material of the skirt which has entered the locking recess, rather than by reforming the skirt to its original shape.

The inward bulging of the skirt may be as a result of the skirt being folded at an intermediate position along its length, or by material of the intermediate part of the skirt being extruded into the locking recess. However, we attach considerable importance to the fact that material of the skirt immediately adjacent to the stop-face 31 does not move inwardly, but remains in its original radial position.

Figure 5:
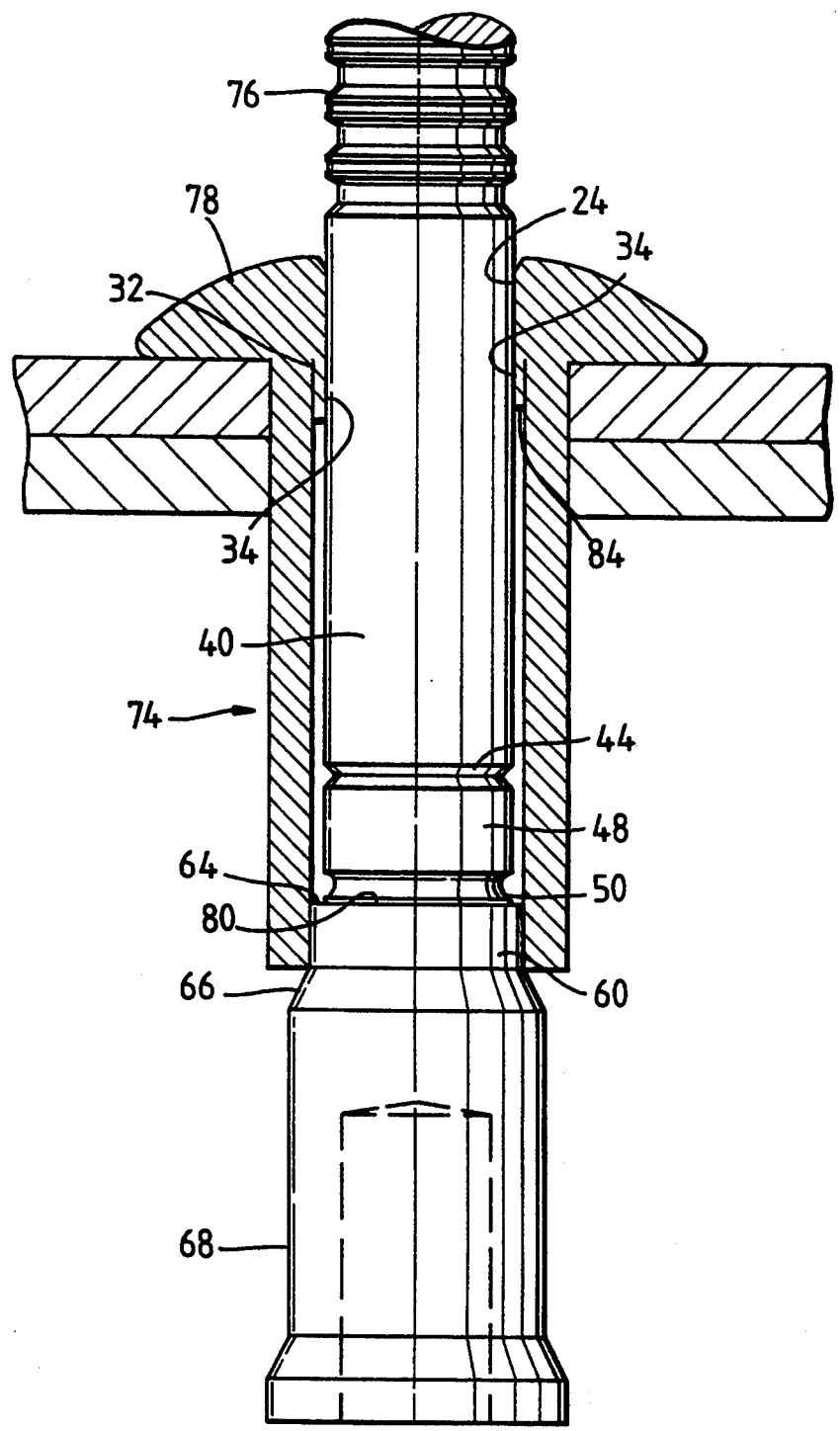
FIG. 5 is an elevation partly in section, of parts of a fastener similar to that of FIG. 1, but having a body and a stem each of modified form.

Referring now to FIG. 5, there is shown a modified fastener 74 generally similar to that of FIG. 1, and in which similar parts are referred to by the same reference numerals. The fastener 74 has a stem 76 and a body 78.

In the modification, the plug part of the stem 76 has a cylindrical land 80, having a diameter substantially the same as that of the reduced region 24 of the bore of the body 78, so as to be able to enter the region 24.

The land 80 is formed between the locking recess 50 and the planar face 64 of the plug and has an axial length which is very short compared with the axial length of the skirt 34.

Figure 6:
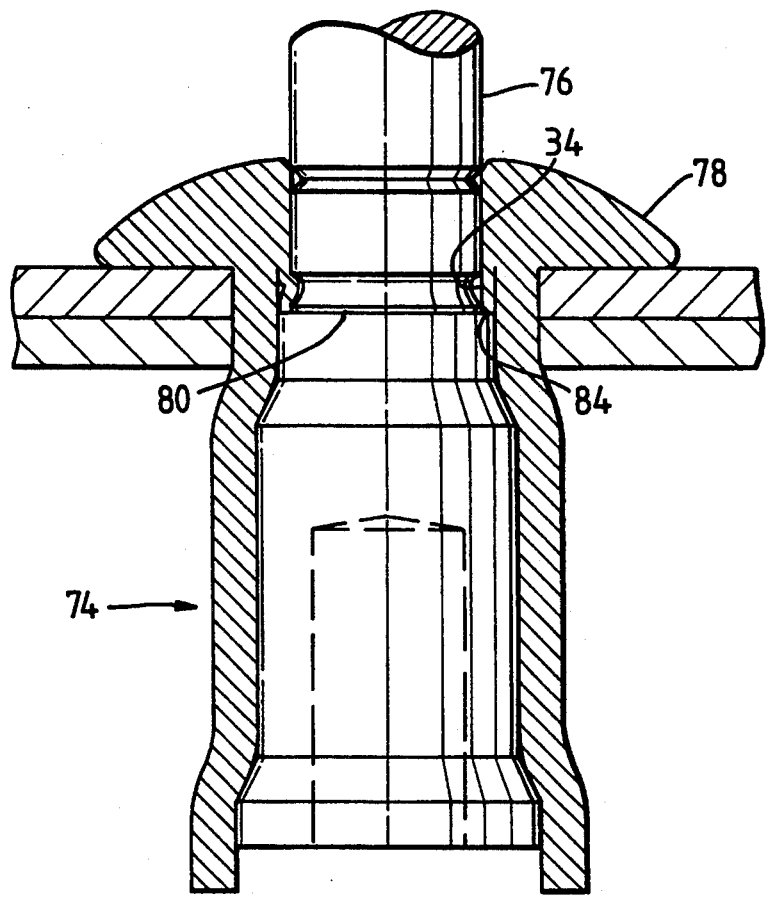
FIG. 6 is a partly sectional elevation showing an intermediate stage in the installation of the fastener of FIG. 5 in an apertured workpiece.

Thus, when the plug is pulled into the body during setting of the fastener, the land 80 is able to enter a short distance into the reduced region 24 just before the planar face 64 of the plug engages the planar stop face at the free end of the skirt. Thus, as shown in FIG. 6 the land 80 lies radially within the free end of the skirt so that it may give support against radially inward movement of the free end of the skirt should this be necessary. However, as the land 80 is axially much shorter than the skirt, it does not interfere with, or obstruct, the radially inward movement into the locking recess of material of the intermediate part of the collapsing skirt.

It will be understood that the force required to cause axial collapse of the skirt is considerably greater than would be required simply to constrict or bend inwardly the free end of the skirt, as in the prior fasteners. The fastener of FIG. 5 therefore includes another modified feature whereby, it is believed, the locking together of the plug and body may be substantially completed by forces appreciably less than the maximum force required to set the fastener. This has the advantage that, even in the event that the breakneck fractures at a load less than it is designed to sustain, the locking together of the plug and body will nevertheless be substantially complete, and not significantly less strong than intended.

Thus instead of the stop face of the body lying in a plane at right angles (90°) to the axis of the body, it is inclined to that plane at an appreciable angle which can be as great as about 10°.

In this embodiment the body 78 has a stop-face 84 which lies in a plane at an angle of 7° to the plane perpendicular to the axis, and the planar face 64 of the plug is at right angles to the axis as in the embodiment of FIG. 1. Thus, the stop face 84 is not parallel to the planar face 64.

As a result, when the stem is pulled to set the fastener, the planar face 64 first engages the stop face 84 at a single point on its circumference, and begins to apply an axially compressive force to the skirt at that point. Consequently the skirt begins to undergo deformation in a radial region corresponding to the point of application of the compressive force as shown in FIG. 6. As the deformation takes place, with material of the skirt beginning to enter into a limited sector of the locking recess, the deformation of the skirt permits the planar face of the plug to enter into engagement with a progressively greater angular sector of the stop face 84, and progressively to deform a greater angular part of the skirt into the locking recess.

Figure 7:
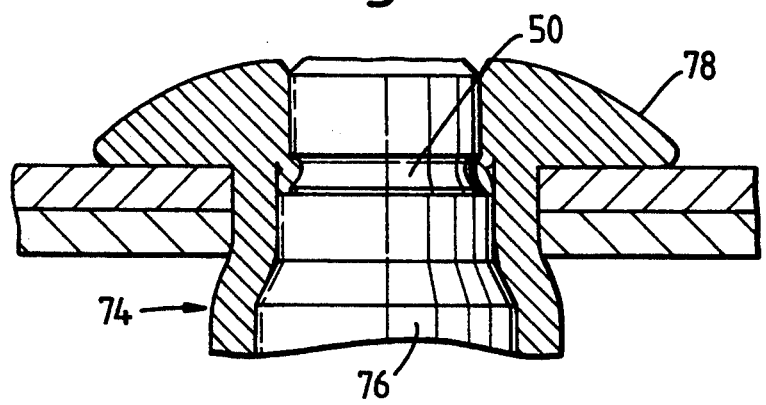
FIG. 7 is a fragmentary view showing a final stage in the installation of the fastener of FIG. 5.

Eventually, the entire circumference of the planar face 64 will, or should, engage that of the stop face 84, and a complete ring of skirt material will have entered into the locking recess as shown in FIG. 7.

It will be appreciated that, in this embodiment the amount of force required to produce the initial deformation of the skirt is relatively small, but, as the deformation progresses, with an increasing amount of material being moved into a decreasing volume of space, the force ultimately required to deform the entire circumference of the skirt becomes very great. This ultimate force has to be transmitted by the breakneck 46 and then the breakneck has to be broken by the application of a suitably greater amount of force by the tool. Obviously, it is necessary to maintain a suitable differential between the amount of force required to complete the locking of the plug within the body and that required to break the breakneck. However, due to the fact that in this embodiment the lock begins to form at a relatively low force, it is possible safely to maintain a rather smaller differential between the ultimate force required to complete formation of the lock, and the force required to break the breakneck, since it is known that, even if the breakneck should break before the full predetermined force required to break the breakneck has been applied, it is probable that an adequately strong lock between the plug and body will have been formed.

Figure 8:
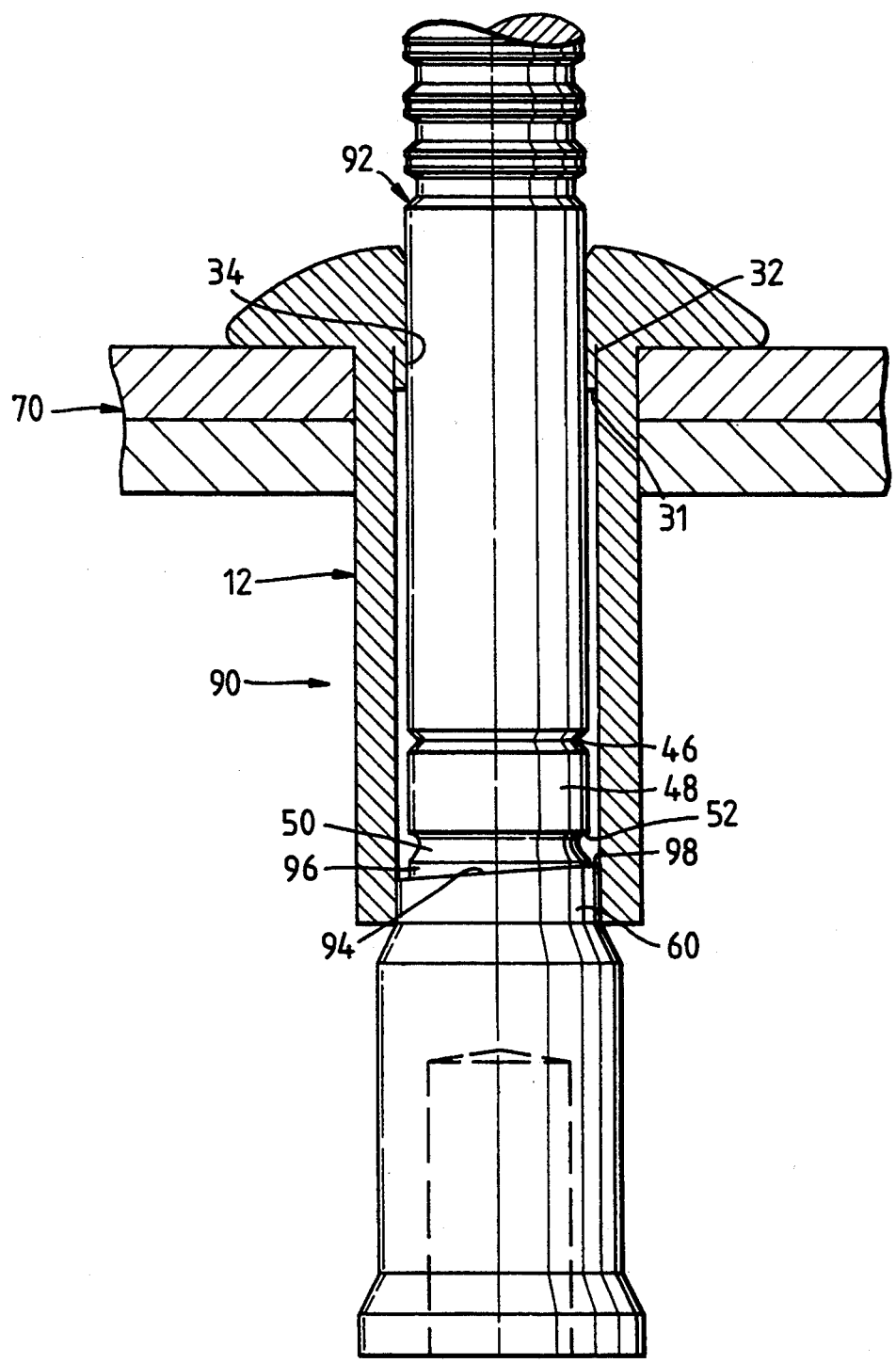
FIG. 8 is an elevation, partly in section, of another modified form of fastener according to the invention.
Figure 9:
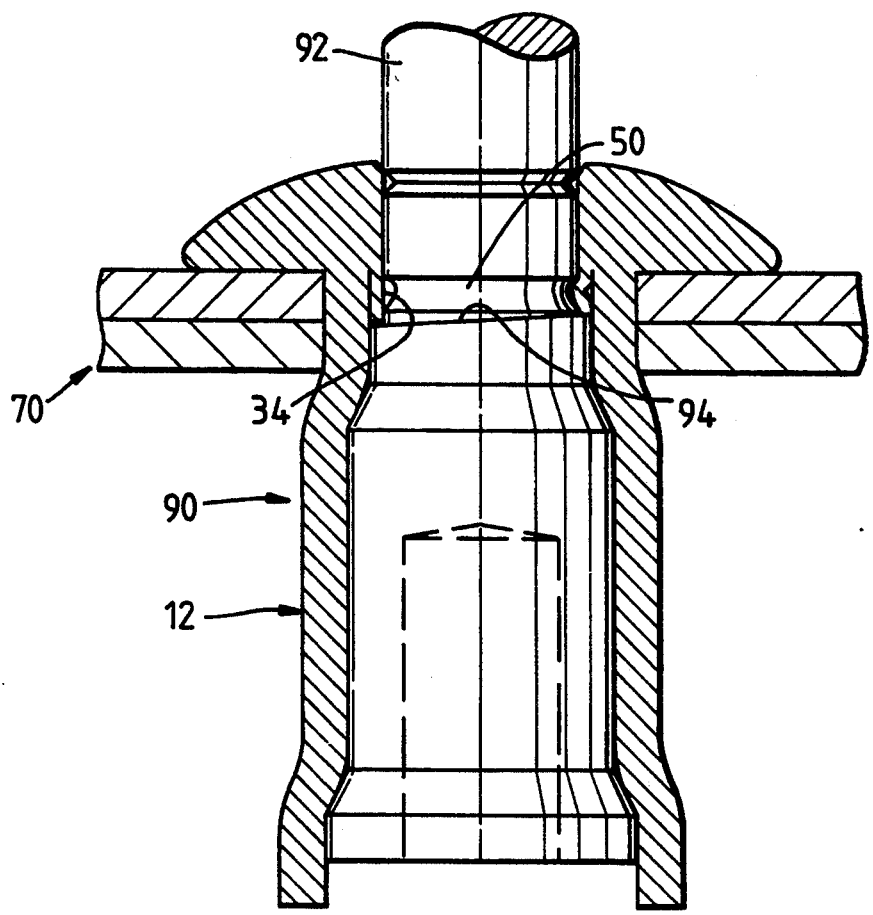
FIG. 9 is a partly sectional elevation showing the fastener of FIG. 8 in an intermediate stage of installation in a workpiece.
Figure 10:
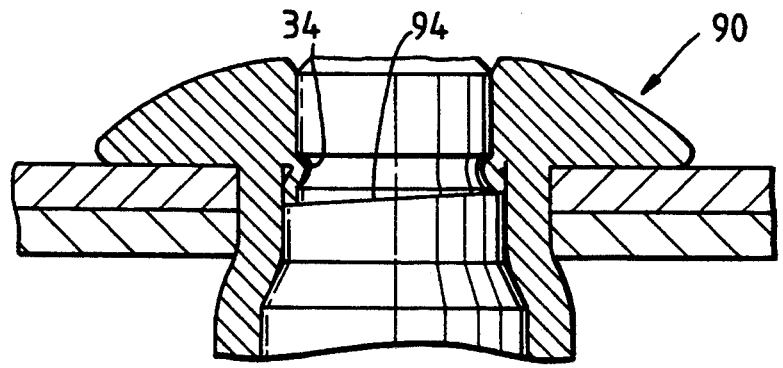
FIG. 10 is a fragmentary view showing the fastener of FIG. 8 on completion of its installation.

In another modification, a fastener 90, shown in FIG. 8, has a body 12 the same as that of the fastener 10 in FIG. 1, and a stem 92 which is generally similar to the stem 14, but which has a plug shoulder which presents a planar face 94 at an angle of 7° to a plane at right angles to the longitudinal axis of the plug. Thus, the planar face 94 makes an angle of 7° with the stop face of the body which is at right angles to the axis of the body.

The stem 92 includes a land 96 between the planar face 94 and the locking recess 50, the land having the shape of an obliquely cut cylinder, and being of such length that the point indicated by the reference 98, at which the planar face 94 is nearest to the locking recess 50, is aligned with the side of the locking recess remote from the breakneck. On the side diametrically opposite to the point 98, the planar face 94 is spaced further from the locking recess by the land 96.

It will be apparent that, in setting the fastener 90, the skirt is first engaged on one radius by the point 98 on the planar face, and, as the skirt becomes deformed in a region corresponding to the point of first engagement, the engagement and consequent deformation of the skirt is propagated to the diametrically opposite side.

As in the case of the fastener 74 shown in FIG. 5, the initial load required to begin forming the lock is low, and increases progressively as more of the skirt is engaged and subjected to compressive force.

Thus, it will be appreciated that, in this modification, the same effect, of progressively forming the lock with a low initial load, as in the embodiment of FIG. 5 is achieved, although the means by which it is achieved is different.

The invention is not restricted to the details of the foregoing embodiment.

Thus, for example the skirt 34 could be three or even four times, rather than twice, as long as its radial thickness.

I claim:

1. A self-plugging blind fastener comprising a tubular body and a stem, the body having an elongate shank, a radially enlarged preformed head at one end of the shank, a tail end at the other end of the shank and a bore extending axially throughout the body from the tail end to the head end, the bore having a main region extending from the tail end of the shank to an annular stop-shoulder adjacent to the preformed head, and a region of reduced diameter, as compared with the main region, extending from the stop-shoulder towards the head end, the stop shoulder presenting a stop-face which faces towards the tail end, and having an annular cleavage coaxial with the reduced region of the bore and extending axially from the stop-face towards the head end of the body, whereby the stop shoulder is radially separated from surrounding material of the body, and thus forms an integral annular skirt on the radially inward side of the cleavage, said stem being disposed in the bore of the body, and comprising an elongate stem-tail which extends through the reduced diameter region and projects from the head end of the body, and a plug disposed adjacent to the tail end of the body and joined to the stem-tail by a frangible breakneck, the plug having a first part adjacent to the breakneck, a locking recess spaced from the breakneck by the first part, a radially enlarged plug shoulder adjacent to the locking recess, and shank enlarging means whereby, on pulling the plug along the bore towards the preformed head, the shank may be radially enlarged to form a blind head, said radially enlarged plug shoulder presenting a planar face directed towards the stem-tail for engaging the stop face of the body, whereby, on pulling the plug along the bore, the annular skirt may be engaged by the planar face of the plug and deformed so as to enter the locking recess of the plug, wherein the stop-face of the annular skirt is planar, whereby, on pulling the plug so as to move the planar face of the plug shoulder axially into engagement with the planar stop-face of the skirt, so as to apply an axially compressive load to the skirt, the skirt is deformed at a position intermediate between its ends, so as to enter the locking recess, and the stop-face at the free end of the skirt remains in static engagement with the planar face of the plug shoulder.

2. A self-plugging blind fastener, as claimed in claim 1, wherein the planar stop-face of the body and the planar face of the plug shoulder are at right angles to the axis of the body and stem.

3. A self-plugging blind fastener as claimed in claim 1, wherein the planar stop-face of the body is inclined at an angle to a plane at right angles to the axis of the body.

4. A self-plugging blind fastener as claimed in claim 1, wherein the planar stop-face of the body is inclined to a plane at right angles to the axis of the body at an angle not greater than 10°.

5. A self-plugging blind fastener as claimed in claim 4, wherein the said angle is 7°.

6. A self-plugging blind fastener as claimed in claim 1, wherein the planar face of the plug is inclined at an angle to a plane at right angles to the axis of the stem.

7. A self-plugging blind fastener as claimed in claim 1, wherein the planar face of the plug is inclined to a plane at right angles to the axis of the stem at an angle not greater than 10°.

8. A self-plugging blind fastener as claimed in claim 7 wherein the said angle is 7°.

9. A self-plugging blind fastener as claimed in claim 1, wherein the plug has a land between the planar face of the plug and the locking recess.

10. A self-plugging blind fastener as claimed in claim 9, wherein the land has a diameter substantially the same as the diameter of the reduced region of the bore.

11. A self-plugging blind fastener as claimed in claim 1, wherein the locking recess is an annular groove.

12. A self-plugging blind fastener as claimed in claim 11, wherein the locking recess has a steep locking flank and a less steep blending flank.

* * * * *